United States Patent [19]

Funabashi et al.

[11] Patent Number: 5,175,797
[45] Date of Patent: Dec. 29, 1992

[54] LEARNING TYPE DECISION SUPPORT SYSTEM

[75] Inventors: Motohisa Funabashi, Sagamihara; Takushi Nishiya, Machida; Masahiro Oba, Sagamihara; Mikio Yoda, Tokaimura; Kazuo Kera; Kiyomi Mori, both of Hitachi, all of Japan

[73] Assignee: Hitachi, Ltd., Tokyo, Japan

[21] Appl. No.: 575,951

[22] Filed: Aug. 31, 1990

[30] Foreign Application Priority Data

Sep. 1, 1989 [JP] Japan .................. 1-224420

[51] Int. Cl.⁵ .......................... G06F 15/18
[52] U.S. Cl. ...................... 395/22; 395/11; 395/61; 395/68
[58] Field of Search ........... 395/11, 22, 61, 68; 364/513

[56] References Cited

U.S. PATENT DOCUMENTS 4,979,126 12/1990 Pao et al. .................. 364/513

OTHER PUBLICATIONS

Stephen I. Gallant, "Connectionist Expert Systems", Communications of the ACM, vol. 31, No. 2, Feb. 1988, pp. 152–169.
Richard C. Lippmann, "An Introduction to Computing with Neural Nets", IEEE ASSP Magazine, Apr. 1987, pp. 4"22.
H. Akaike, "Information Theory and an Extension of the Maximum Likelihood Principle", 2nd International Symposium on Information Theory, 1973, pp. 267–281.

Primary Examiner—Allen R. MacDonald
Attorney, Agent, or Firm—Fay, Sharpe, Beall, Fagan, Minnich & McKee

[57] ABSTRACT

A method and apparatus of a learning type decision support system are provided for improved acquisition of a priori knowledge from the system object and expression of non-linear structures in the object. The system is comprised of a learning module and an executing module for outputting advice and process manipulate command values to system users by receiving input data comprising on-line data and file data. The learning module comprises (1) a symbolized dictionary unit for generating a symbolized dictionary for giving a symbolic name in accordance with a pattern comprised of a combination of the values of the input data by giving examples of a pair of the pattern and the symbolic name; (2) a preprocessing unit for transforming at least a portion of the input data into the symbolic name with reference to the symbolic dictionary generated; and, (3) a model generating unit for determining an unknown parameter contained in a predetermined skeleton model to transform the preprocessed results into desired advice and manipulation command values. The executing module arithmetically processes the input data to output the advice and the manipulation command values by using the symbolized dictionary generated by the learning module and the generated model.

17 Claims, 13 Drawing Sheets

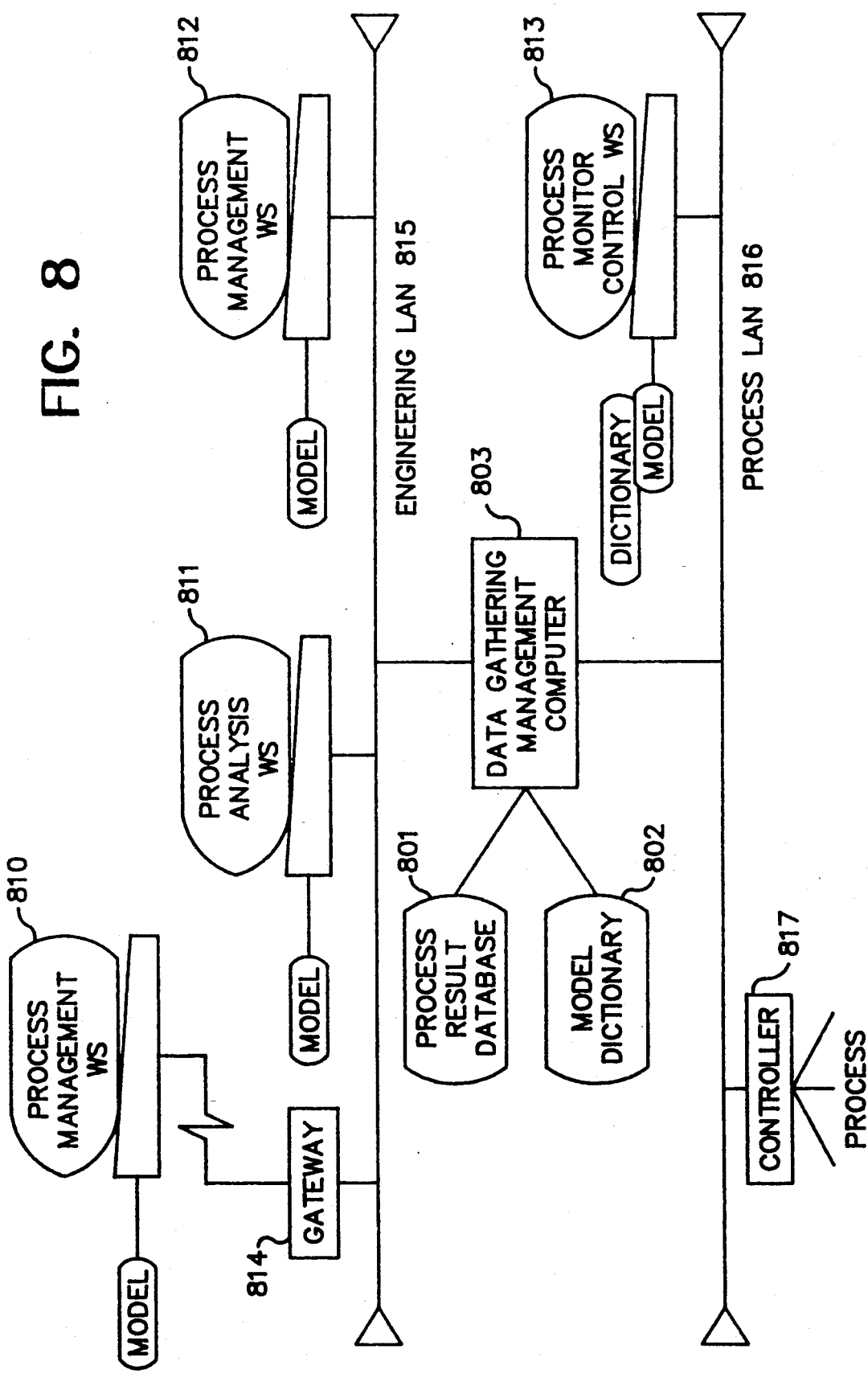

STRUCTURE OF MATRIX A $$\begin{pmatrix} A_{11} & A_{12} & \cdots & A_{1n} \\ & A_{22} & \cdots & A_{2n} \\ 0 & & \ddots & \vdots \\ & & & A_{nn} \end{pmatrix}$$

LEARNING TYPE DECISION SUPPORT SYSTEM

BACKGROUND OF THE INVENTION

1. Field of the Invention

The present invention relates to connectionist expert systems and in particular to a decision support system especially implemented in a data processing system having an algorithm based architecture including artificial neural net models.

2. Description of the Prior Art

There are three fundamental functions of a decision support system: (1) Monitor and Control, (2) Decision Support, and (3) Data Offer.

Monitor and Control comprises system analysis on the basis of a predetermined model of the data available to the system over a period of time. The model is generated by an expert who is knowledgeable of the operation of the object or target of the support system. The result of the analysis and whether there is conformity to the model are communicated, if necessary, to a monitor so that any actions to the target being monitored may be precise and timed. Routine actions (or controls) requiring no monitor decision may be incorporated as functions of the processing system.

Modeling Support comprises using the data obtained over the period of time to conform and refine the model (or hypothesis). These functions may be executed under real time circumstances equivalent to the time scale of Monitor and Control or under less stringent time scale circumstances. The model thus generated by the analysis over a longer period of time may be used as an element of the monitoring function under the real time circumstances.

Data Offer comprises offering the data stored over a period of time in response to a request of the data analyzer or the decider who owns the model. The usual requesting manner includes specifying the data to be retrieved on the basis of various indexes. However, it is conceivable that there can be other methods of presenting sample data to determine the approximate data.

The present invention relates to a data processing system including an algorithm architecture for realizing these functions.

Some known representative decision support systems for industrial process control and business analysis can be briefly summarized, along with their practical problems, for a better understanding of the applications of the subject invention.

(1) A Plant Control System:

Computer control technology has drastically promoted plant automation. It is now practical that steady states can be held by computer control alone. However, for most situations involving unsteady states such as the disposal of an abnormal situation, or the start, stop or variation of a plant run, the decisions of expert operators are still necessary.

As the opportunities for having the computer system control the plant run continue to increase, the plant scale which must be covered by the computer system grows much larger. This scale can be approximately estimated in terms of the number of inputs/outputs to the computer system, which number is frequently as large as several thousands in recent years. As a result, the number of unsteady state plant run portions which are too difficult for automation and which must be entrusted to the decisions of the operators is also continually increasing. How to support the operator in the unsteady states and how to educate an operator capable of making the proper decisions in the unsteady states have become significant industry needs.

For these situations, it is the overall objective of a supplier of the system control technology to prepare an expert model for the plant run and to manipulate the model in accordance with occurring experiences, by effectively analyzing the causes of system symptoms and deciding the correct running methods, or to provide a computer environment for the plant capable of executing the necessary decisions. Here, the model does not indicate any numerical equation derived from prior experiences, but more general expressions (such as rules or frames), i.e., a knowledge engineering model. Attempts to express successful management models for running the plant with such knowledge engineering models have already been made in chemical plants and power plants. However, such attempts still remain at the trial and error stage so that a methodology and operating algorithm for developing and implementing expert models that can practically approach real phenomenon are still desired.

(2) A Dealing System:

Dealing systems, as in the trading of stocks, involve prices which may vary quickly and which have to be grasped to deal the stocks properly and successfully. As the variety of dealing continues to grow and expand globally, the experts for this business have become very rare so that how to educate or secure them is an important interest in this field.

In stock dealing, it is important to identify the experts who are capable of instantly deciding how to deal with the fluctuations in the stock prices. One manual providing a method of reading the stock prices, called the "Point & Figure", is available but has not reached yet the stage at which it can be utilized in real time.

The benefits of an expert with long experiences in stock dealing are desired to be introduced as the knowledge base into a computer, but it remains unsolved how to relate the actual stock price fluctuations to the necessary knowledge, or what useful form the fragmentary knowledge is to be integrated into.

Despite the awareness of the need to implement computer systems capable of making the kinds of decisions mentioned above in industrial control or business on a real time basis, such systems have not been achieved. However, the mass data required to make the decisions is being gathered so that the system decisions could be raised to a higher level by integrating all the data properly. Despite this fact, this concept is not yet embodied because the data integrating means, i.e., the technology of modeling the real phenomenon fails to follow. In particular, the knowledge engineering approach proposes a concept of breaking the limitations of the traditional modeling methods, but still stops in an undeveloped state relating to the correspondence to the real phenomenon, so that further investigations are earnestly desired.

PROBLEMS TO BE SOLVED BY THE INVENTION

There are two principal problems of the prior art decision support systems and both reside in the low level of the modeling technology, as will be more specifically itemized below:

(1) Utilization of A Priori Information:

The leading technology in this field comprises systematological modeling, wherein black box modeling for estimating the parameters of the operating structure of an object from real data is accomplished by setting the structure in its normal state has been the main theme in the development of this method. However, some form of a priori knowledge necessarily exists to define an actual problem and its solution. Moreover, this a priori knowledge is not assumed by the black box modeling to have several explanatory causal relationships, but merely contains information relating the operating structure to a particular knowledge defining causal relation, which may not be definite. Accordingly such systems are limited by the a priori information that they can contain. For an improved decision support system, it is absolutely necessary to incorporate as much a priori information as possible. This is the reason for considering knowledge engineering or Fuzzy logic, so that as much a priori information as possible can be employed by the system. For specific modeling, how to utilize the a priori information is one major problem, and a knowledge engineering approach suggests one direction for solving this problem.

(2) Expression of Non-Linear Structure:

For an object that is assumed to have linear structural relationships, a premise need only be made by the black box, and the resulting systematological modeling provides a powerful and valuable system. If, however, non-linear structural relationships have to be entered, a method for determining solutions to problems is hard to obtain. Description of non-linear phenomenon by the expansion to a polynomial function is limited. Methods of using piece-wise linearizing are methodologically immature, too. For the success of a method using piece-wise linearizing, it is important from what standpoint a phenomenon is to be cloistered. A variety of proposals have been proposed for the cloistering method, but how to set the input of the cloistering for the data obtained from the time-series phenomenon is not solved yet.

An effective means for solving the non-linear problem is the knowledge engineering approach. The handling of the non-linear relations can be apparently solved all at once by transferring the quantitative relationships to symbolic relationships. Although, the concept of the grade of Fuzziness or the Fuzzy assurance degree is introduced as the methodology for relating the symbolic expressions to the real data, it is not enhanced yet to specific procedures. In these situations, a valuable suggestion called the "Connectionist Expert System" has been made in recent years [Reference should be made to S. I. Gallant: Connectionist Expert System, Com. of ACM, Vol. 31, No. 2, 152 to 169 (1988).].

This suggestion is intended to fuse knowledge engineering concepts and neuro-computing. However, what is actually done is a suggestion on how to adjust the assurance degree of a classification type expert system. It fails to resolve the basic problem of defining or setting the modeling, which is the especial subject of the present invention, so that the basic problem is still at an uninvestigated stage in the point of data processing system architecture.

As described above, the systematological modeling methods of the prior art are inadequate in two main points, utilizing the a priori information that cannot be systemized for expression in a numerical equation, or expressing a non-linear phenomenon. Although knowledge engineering using a symbolic standpoint seems most promising for solving these problems, it is not yet developed to the point in its present stage where it can do the job.

The present invention contemplates a new and powerful data processing method and system which provides, as a technique for solving such problems, a distributed information processing system, i.e., a system and method to solve the problems by the neuro computing.

BRIEF SUMMARY OF THE INVENTION

In accordance with the present invention a learning type decision support method and system is provided for outputting advice and command values for process manipulation to system users by receiving on-line data and file data as input data. A learning portion of the system includes a symbolized dictionary, a preprocessing unit and a model generating unit. The symbolized dictionary gives a symbolic name in accordance with a pattern comprised of the combination of the values of the input data by setting as a particular example a selected pair of a specific pattern and a symbolic name. The preprocessing unit transforms a portion of the input data into the symbolic name. The model generating unit determines an unknown parameter from a predetermined skeleton model, typically supplied by an outside expert, which is useful to transform the results from the preprocessing unit into the desired advice or command values. The determination is made by the use of a rule, a numerical equation or an arithmetic algorithm, and is accomplished by giving to the skeleton model the example of the pair of the input data and the necessary transformed results. An executing portion of the system arithmetically processes the input data to output the advice and command values by using the symbolized dictionary generated by the learning means and the generated model.

In accordance with another feature of the invention, the symbolized dictionary includes a portion for arranging the input data into symbolic variables with a conformity degree through a fuzzy reasoning function, and a combination circuit with a weighing parameter layered structure comprised of elements of neuro-models for receiving the symbolic variables.

It is an object and advantage of the subject invention that a learning type decision support system is provide which provides improved levels of utilization of the a priori knowledge available for running or analyzing a particular object or target system, and which has the ability to correctly identify and process non-linear phenomenon.

BRIEF DESCRIPTION OF THE DRAWINGS

FIG. 8 shows one embodiment of distributed type computer system including the subject invention;

DETAILED DESCRIPTION OF THE PREFERRED EMBODIMENTS

Figure 1:
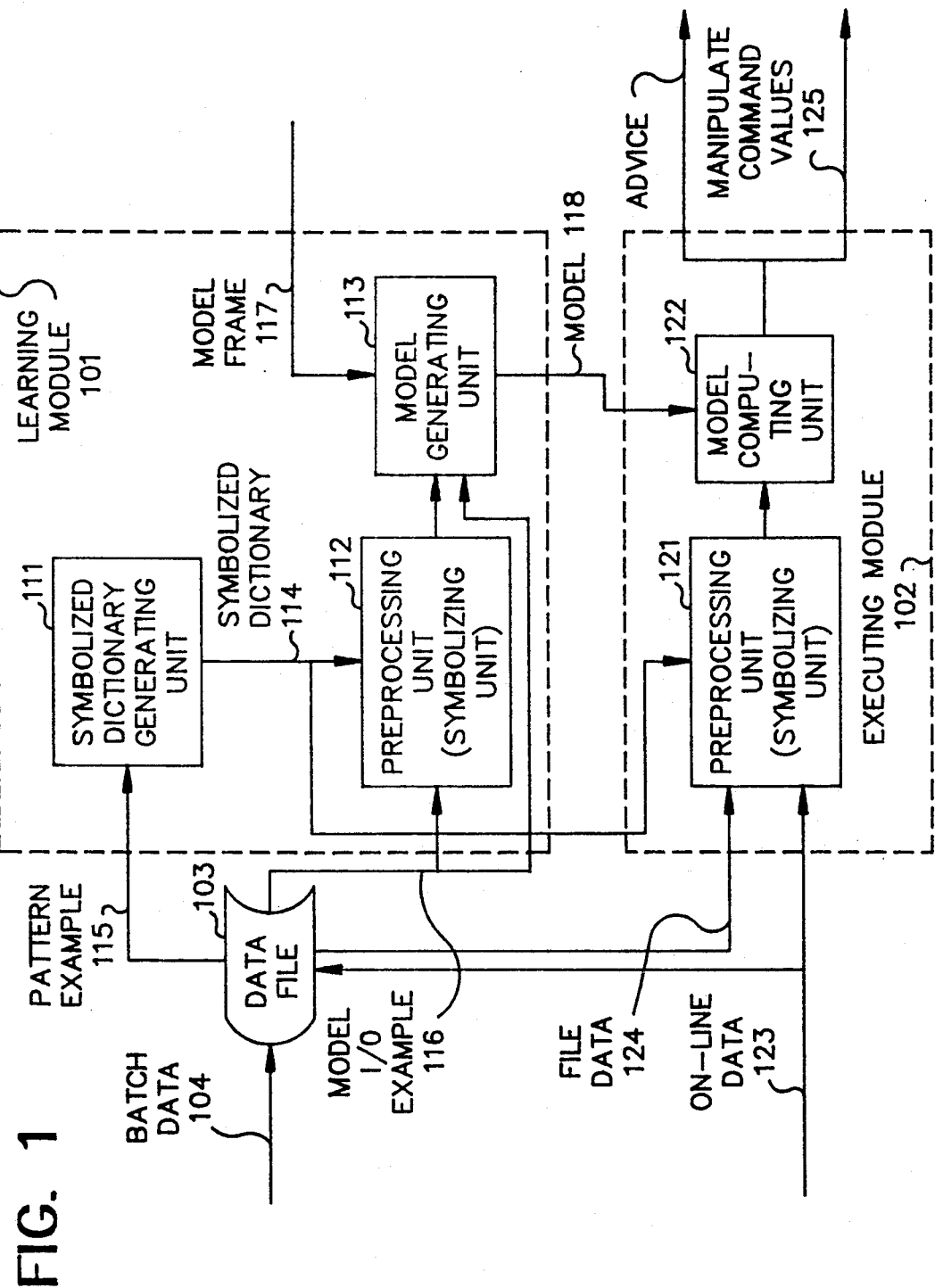
FIG. 1 shows the overall structure of one embodiment of the present invention.

Before referring to the Figures the invention will be best understood with an explanation of its general operating procedures.

As noted above, the problems of traditional expert system modeling approaches can be summarized into the following two points: (a) the low level of utilizing the a priori knowledge; and (b) the low ability of expressing non-linear phenomenon. The fundamental concepts for solving these problems in accordance with the present invention are as follows.

In order to raise the level of utilizing the a priori knowledge it is useful to use a knowledge engineering method, as has already been pointed out. However, it is both necessary to acquire the a priori expert knowledge that is conceptually owned by a human expert, such as the correspondence of the object state to a real phenomenon, and also the actual data of causality which will backup or suggest adjustment of the conceptual correspondence.

In order to raise the ability of expressing the nonlinear phenomenon, a description of the symbolic causal relations may solve the non-linear problem caused in the description of quantitative relations. However, the recursive modeling technology for implementing such symbolic causal relations is still in an immature stage. The quantification theory presents a valuable concept for solving this problem but fundamentally stands at the level of black box modeling so that the problem still remains of how to practically express the non-linear phenomenon utilizing the a priori knowledge. Moreover, since the fundamental structure assumed by the quantification theory is a linear one similar to a multiple recurrence, it has a limited effect. A so-called "combination circuit", i.e., a multi-layered network for neuro computing is effective for extracting the non-linear relationships by multi-layering a linearity discriminating mechanism. However, a similar problem is included with the point that this circuit still has the black box character.

In order to overcome these problems, it is a feature that the following characteristics relating to the modeling are utilized by accepting an especially important time series phenomenon as a main subject in the case of a decision.

Characteristic 1: Existence of Primitives

This is the characteristic by which there is a sufficient set of symbols for describing objects having a continuous value range of time-series phenomena. Here, these symbols will be called the "primitives". The background capable of assuming the existence of such symbols is the theory of dynamic (or differential equation) systems. According to this theory, motions in a continuous space can be understood in terms of their limit sets. In the case where the limit sets are of a finite number, the overall phenomenon is described by selecting the symbolic set sufficient for the descriptions.

Characteristic 2: Relations Between A Priori Knowledge and Primitives

The a priori knowledge owned by the human (i.e., the expert relating the subject) is the conceptual state relating to the subject and the causal relation to the conceptional state, which is a part of the set family of the primitives. For example, in the case of a blast furnace, the expert will know based upon a particular furnace temperature if the furnace is not in the appropriate steady state. The temperature signal is a primitive by which the expert can express a causal relation to the state of the blast furnace. It may not be theoretically supportable that the particular form of the a priori knowledge comprises the state concept and its causal relation. However, the manner of grasping the knowledge is useful for modeling the experiences of complex phenomena such as intensely non-linear complex phenomena in a garbage furnace or an iron blast furnace. It is apparent from the definition of the primitives that the conceptional state will be formed by the primitives. Since a human expert cannot know all phenomena, the conceptional state could be said to be a part of a family set of the primitives.

In order to construct a model of a non-linear phenomenon, according to the characteristics thus far described, it is necessary to extract the primitives and correlate them. The a priori knowledge must be incorporated in the extracting and correlating procedures. For the primitives, a time series data symbolizing method ("Pattern Recognition Method and System" (Continuation-In-Part Application No. 07/526000 based on U.S. Ser. No. 410,053)) by Nishiya et al., is used, and the subject is achieved by using the neuro computing concept, i.e., the distributed type information processing for the correlations among the causes. In the following, the existence of a priori knowledge is eliminated at first to construct the functions for the modeling from the standpoint of the black box modeling, and then the specific operations of the present invention, .e., the gray box modeling method utilizing the a priori knowledge will be described.

The extractions and correlations of the primitives are intrinsically complimentary. This is because the developing degree of the modeling cannot be accomplished by other than the results, i.e., the comparisons between the output of a subject phenomenon and the model computed value. However, let it be assumed that the primitives have been extracted. In this case, the primitives may be correlated by the aforementioned multi-layered network. However, there is still left the fundamental problem of how the multi-layered network is to be specifically constructed. Another problem is that the square of the errors of the model computed values is merely taken as the standard for determining the weight of the network. A function to prevent the sample data from any excessive conformity has to be introduced by introducing the AIC concept of Akaike.

First of all, the structure of the network will be examined. If the subject phenomenon is linear, the fundamental structure in the quantitative world can be internally expressed by:

$$dx/dt = Ax + Bu \quad (1)$$

$$y = Hx.$$

Figures 10A, 10B:
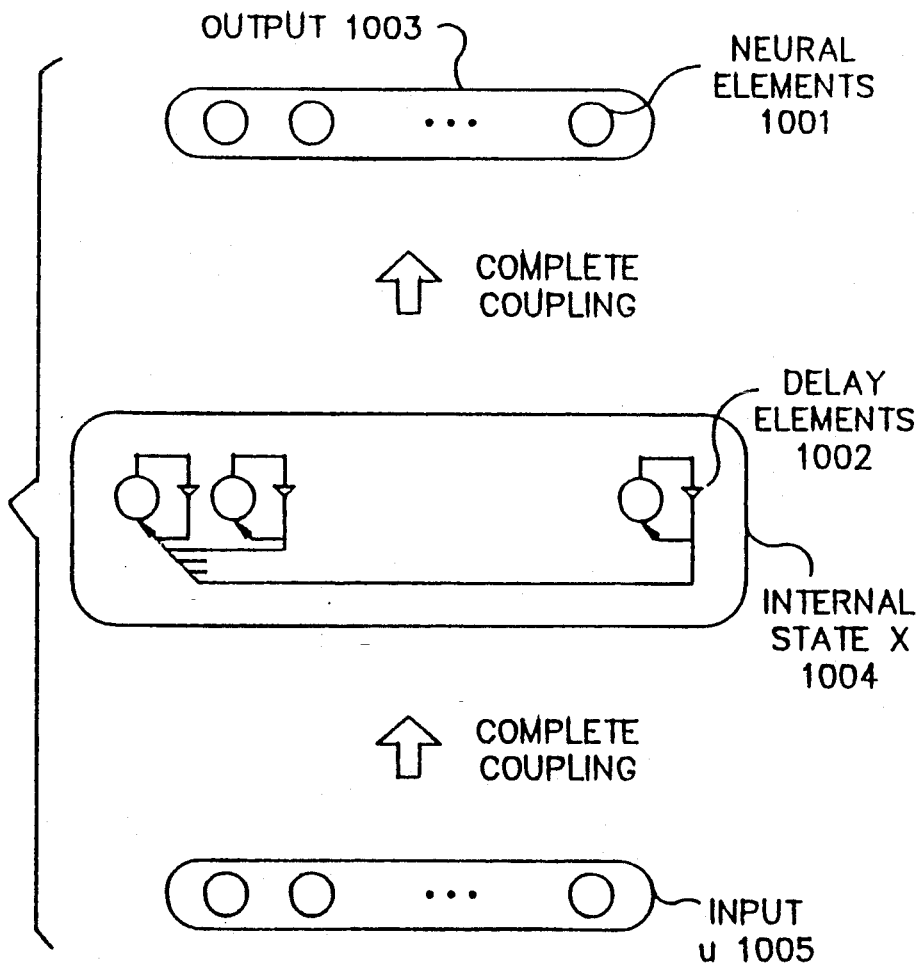
FIGS. 10A and 10B show the structure of the causal relationships in a model of a general linear phenomenon; and, FIGS. 11A and 11B show the structure of the causal relationships in a model of a general non-linear phenomenon.

As an analogy from this structure, the relational expressions of the inputs and outputs in the symbolic world are presented in FIG. 10A by plotting the Equation (1) causally. A similar suggestion will be made for a non-linear subject. If the nonlinear phenomenon can be theoretically expressed by a Volterra functional series, its internal expressions are:

$$dx/dt = A - \sum_1 (Aiui)x - Bu \tag{1}$$

$$y = Hx.$$

Figure 11A:
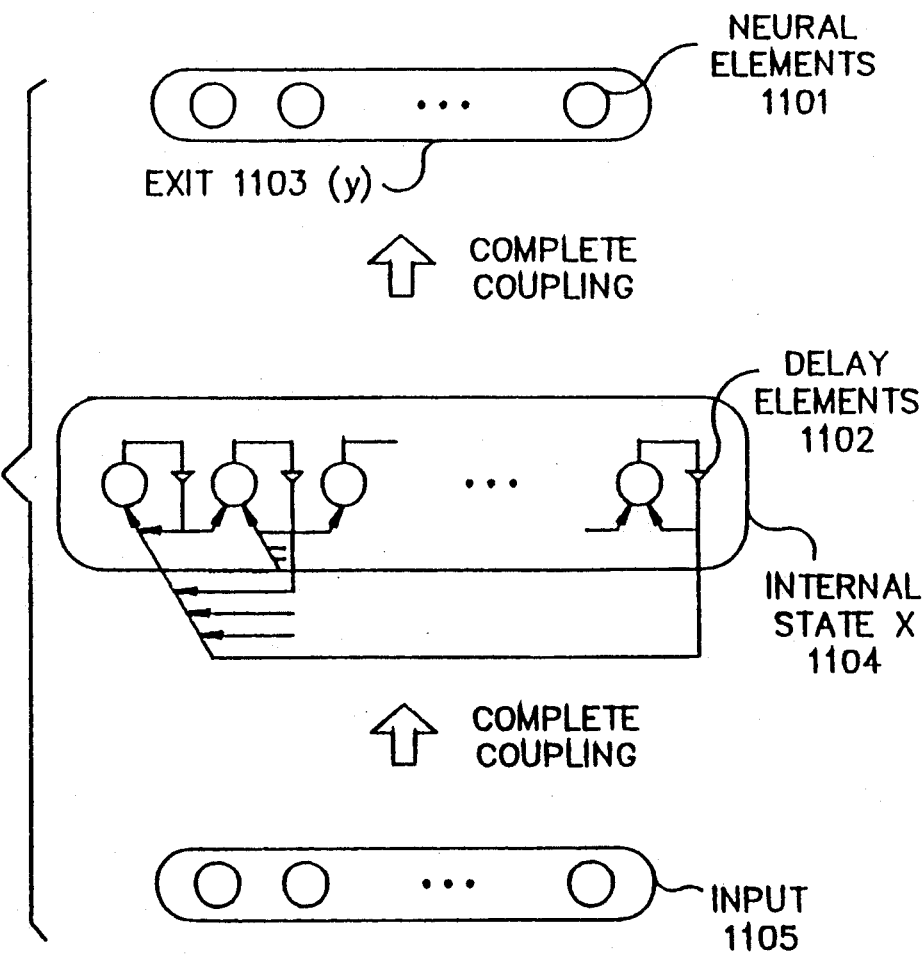

If the symbolic causal relations are analogized from this structure, expressions similar to those of the case of the linear structure assumption are obtained, as shown in FIG. 11A. Here, the difference from the linear structure assumption is that no half diagonal structure is obtained in the relation of the internal state.

It is further necessary to clarify the weight estimating method in the aforementioned network structure. The weight estimation in the multi-layered network is determined by a hill climbing computation with a reference to minimize the model output errors for one pair of input/output data. Here, because of the sequential circuit structure, i.e., the network structure including memory elements, as shown in FIG. 11B, it is necessary to optimize the weight for one pair of input/output data series. In order to avoid the excessive application to the sample data, moreover, it is necessary to introduce the optimizing reference according to the AIC concept. In this AIC, it is attributable to the combinatorial problem whether or not the parameter to be estimated is set at 0 or not. In other words, the parameter is adjusted to minimize the following AIC:

$$AIC = -2 \text{ (Maximum Likelihood)} - 2 \text{ (Number of Parameters)} \tag{3}$$

The reference for the optimization contains the number of parameters, and the reference value is different depending upon which parameter is set at other than 0. Thus, the character of the combinatorial problem arises.

This problem of mathematical optimization is not easy to solve, but an approximate differentiable function expressing the jumping phenomenon at the zero point may be introduced and used as the second term of the Equation (3):

$$nj = \sigma(pj). \tag{4}$$

if $pj = 0$, then $\sigma = 0$.

if $|pj| > \epsilon$, then $\sigma = 1$..

wherein pj designates a parameter j. If the reference for the optimization can be set, its parameter adjustment can be determined by the ordinary numerical computation. Since the AIC is a function of the parameter p, the optimum value p* satisfies the following Equation (6) if the reference for the optimization is expressed by Equation (5):

$$AIC = f(p) \tag{5}$$
and $$\partial/\partial p \, f(p^*) = 0 \tag{6}$$

This Equation is not easy to solve directly but can be deemed as a steady solution of the following differential Equation:

$$d/dt(\partial f/\partial p) = -(\partial f/\partial p) \tag{7}$$

This Equation (7) is rewritten into the following form of the parameter p:

$$dp/dt = -(\partial^2 f/\partial p^2) + \partial f/\partial f \tag{8}$$

The computing Equation of the parameter p is determined, as follows, by expressing the Equation (8) in terms of a discrete time (wherein + designates a generalized inverse matrix):

$$p(t+1): = p(t) - \Delta t(\partial^2 f/\partial p^2) + \partial f/\partial p \tag{9}$$

The backpropagation well known in the multi-layered network is none other than that which is obtained by replacing the term $(\partial^2 f/\partial p^2)+$ by a unit matrix. In the numerical computing method for the optimization, however, various methods are devised so as to accelerate the convergence and to avoid the handicaps of the inverse matrix $(\partial^2 f/\partial p^2)+$. The representative methods are the Newton method, the modified Newton method, the steepest descent method and the conjugate gradient method.

The investigations thus far made are based on the assumption that the primitives are fixed. As a matter of fact, the extractions and correlations of the primitives are complementary, as has been described hereinbefore. The specific methods will be described in the following.

In the time series events, the fundamentals of the symbolic characteristics are roughly divided into three: "the value increases", "the value decreases" and "the value is unchanged". These characteristics actually contain intensities to have their levels divided. If the individual characteristics have their levels divided into the same number (e.g., n), a 3n number of primitives are present for one variable. (Here, the decision of the increase or decrease is different according to the time scale of the phenomenon noted, but this problem can be avoided by applying a filter according to the time scale). The filter developed by us, which is called here the "filter of approximation by piece-wise straight lines", can decide the increase or decrease of the value in terms of the set time scale). Thus, the adjustment of the primitives is attributed to a kind of quantization problem how to divide the levels of the three characteristics. Here, this quantization will be executed by introducing the membership function in a Fuzzy theory. Incidentally, as to the output variable, the quantization problem is to be judged in relation to the restoration degree and the required accuracy when the quantized data are restored.

Like the weight decision in the network, the pertinence of the quantization method refers to the difference between the actual data and the model computed value. If a positive value parameter for determining the width of quantization is introduced, the parameter can be processed absolutely like the weighing parameter in the network including the jump phenomenon at the zero point.

Operations

The gray box modeling, i.e., the modeling method assuming the existence of the a priori knowledge, which is a principal feature of the present invention, is considered as a particularly developed type of the aforementioned black box modeling.

This consideration is premised by investigating in detail what the a priori knowledge is. The characteristics of the relation between the a priori knowledge and the primitives have been described hereinbefore. These characteristics are that there is as the a priori knowledge of the expert causal relation between the conceptional state (or state concepts) of a subject and part of the family set (or a combination thereof) of the primitives.

On the basis of these characteristics, the overall procedures of the gray box modeling utilizing the a priori knowledge can be summarized as follows:

Step 1: The a priori knowledge is investigated. The state concepts are extracted to find out their causal relationships with the primitives. For this, a system structuring technology as a tool for supporting the knowledge arrangement is useful.

Step 2: The state concept and the actual phenomenon are combined. The actual phenomenon is wide and various and so that the expert usually finds it difficult to express the combination relationships in words. However, this combination can be grasped as the judgments of the expert for inputting the actual phenomenon and outputting the state concept. Since in this judging procedure it is difficult to identify the appropriate a priori knowledge, the aforementioned black box modeling must be employed. Specifically, the modeling mechanism is caused to execute the modeling by presenting a typical example expressing a state concept. This step is deemed to make a kind of dictionary of defined causal relations for the actual phenomenon.

Step 3: The adjusting factor (or parameter) of the neural network is introduced into the causal relation extracted by Step 1, and the parameter is adjusted to conform to the actual data by using the dictionary determined at the Step 2 as the interface with the actual data. For this adjustment, it is useful to introduce the algorithm for preventing inappropriate limitations to the data, as has been described hereinbefore.

The specific executions of the Steps 2 and 3 thus far described are the major operational features of the present invention. Incidentally, the Step 1 has been investigated in various manners from the standpoint of developing the knowledge acquisition support system and will be especially employed.

Embodiments

Referring now to the drawings where the showings are for purposes of illustrating preferred embodiments of the invention only and not for purposes of limitation. An embodiment of the present invention will be described in the following with reference to FIG. 1. FIG. 1 shows the overall structure of the learning type decision support system of the present invention. As shown in FIG. 1, the present system is constructed of a learning module 101 and an executing module 102.

On the basis of on-line data and/or a portion 124 of the data stored in a file 103 (Which is further stored With batch data 104 other than the on-line data 123 helpful for determining the necessary decision), the executing module 102 generates advice and plant manipulate command values 125 as information for supporting the decision. As a part of the generation, and in response to the on-line data 123 and/or the file data 124, the symbolic names to be used in the model for determining the advice and the plant manipulate command values and the combinations (or patterns) of the values of the input data (123 and 124) are first made to correspond to each other. The correspondence is made at the preprocessing unit 121. These correspondences and raw data, if necessary, are sent as the inputs of the model to a model computation unit 122, in which the model computations are specifically executed.

A symbolized dictionary 114, generated by the symbolized dictionary generating unit 111, is necessary for corresponding the data patterns 123, 124 to the symbolic names in the preprocessing unit 121. A model 118 generated by the learning module generating unit 113 is also necessary in the model computation unit 122 before the advice and command values can be determined.

The learning module 101 is comprised of a symbolized dictionary generating unit 111, a preprocessing unit 112 and the model generating unit 113. The symbolized dictionary generating unit 111 has a function to generate the dictionary for corresponding to each other the symbolic names used in the model and the data value combinations (or patterns). This dictionary generation is executed by selecting and giving a typical pattern example 115 expressing a symbolic name from the data file 103.

The model generating unit 113 generates a model to be outputted to the executing module 102 for determining the advice to the user and the manipulate command values to the plant. The major function of the model generating unit 113 is to estimate the parameters in the model from the actual data so that a model frame 117 obtained from the expert of a problem may function in the form following the actual phenomenon.

For this estimation, input/output data expected to respond as the model are read out from the data stored in the data file 103 and fed to the preprocessing unit (or symbolizing unit) 112 so that they may be changed to the symbolic name used for describing the model until they are sent to the model generating unit 113. This model generating unit 113 performs the model operation on the basis of the model input sent from the preprocessing unit 112. This operational result is compared with the output component of the input/output data 116, and the parameter is adjusted so that the difference may be minimized.

The fundamental model in the decision support system is generally the most appropriate if it accords to the findings of the expert. However, the model has two types of ambiguities, which have to be solved so as to ensure its usefulness. The first ambiguity is the degree of correlation among the knowledge, and the second ambiguity is the bond between the logical knowledge and the actual data. The overall structure of the decision support system shown in FIG. 1 solves those problems and effectively operates not only in case the model resorts to the knowledge of the expert but also in case numerical equations are contained.

Figure 2:
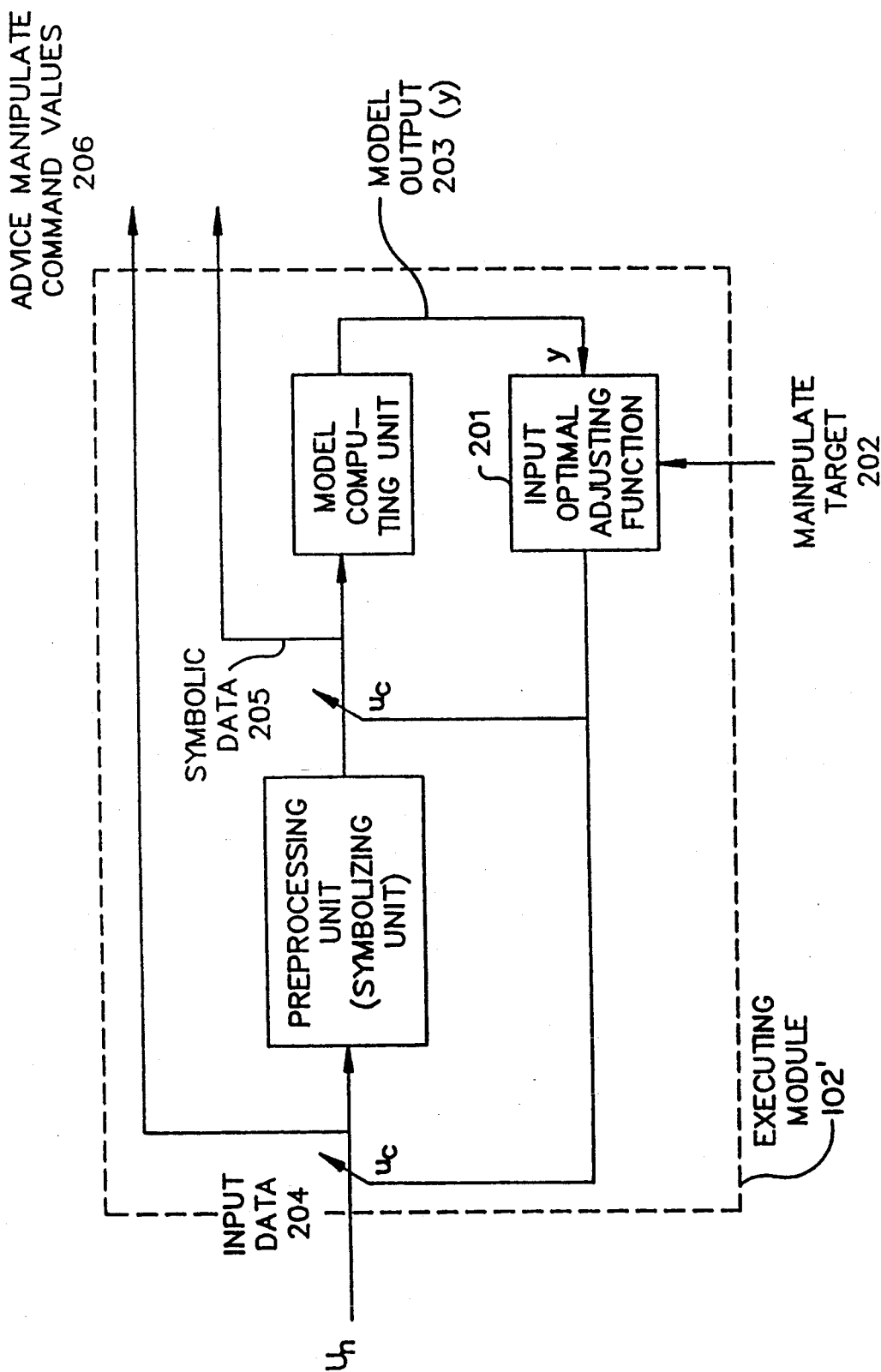
FIG. 2 shows an example of the structure of an executing module for determining the proper advice and manipulate command values.

FIG. 2 shows an alternative embodiment of an executing module 102' in which the functional level of the decision support is improved by adding an input optimal adjusting function 201 to the executing module 102 of FIG. 1. In this embodiment, if a causal relation of a phenomenon to be decided is given as a model, there is provided means for optimizing a causal variable using the model, i.e., a manipulatable variable of the input data under a manipulate target 202 given from the outside. This can be realized by constructing the input optimal adjusting function 201 in the following manner.

A computed result 203 of the model is designated at y and a manipulatable input of the model is designated at $u_c$ whereas the others are designated at $u_u$. It is assumed that the manipulate target 202 can be expressed to maximize the function f(y) of the result y. If the input/output relation of the model is expressed by:

$$y = h(u_c, u_u) \tag{10}$$

the problem of determining the optimal manipulation can be expressed as a mathematical optimizing problem by the following equation:

$$\begin{aligned} &f(y) > \max \\ &\text{subject to} \\ &y = h(u_c, u_u) \\ &g(u_c) \leq 0 \\ &\text{for a given } u_u \end{aligned} \tag{11}$$

wherein g designates a function expressing the allowable ranges of u's.

This mathematical optimizing problem can be solved by the convergence of computing the model h and the manipulate target function f repeatedly while using the assumed initial value $u_c$ as a start value, as has already been described.

The executing module 102' of FIG. 2 assumes that the manipulatable variable is contained in both input data 204 and the output of the preprocessing unit (or symbolizing unit) 205, and shows the determination of the value of the optimal manipulatable variable by adjusting the two. Moreover, the optimal manipulatable variable determined by the convergence is outputted as the advice to the system user and the manipulation command values to the plant.

Thus, the system user can obtain the best manipulate variable value based on the causal relation model and manipulate target relating to a subject thereby to maintain the decision at a highly reliable level at all times.

Particular structural examples of the individual function units shown in FIG. 1 will be hereinafter described in detail as follows.

Figure 3:
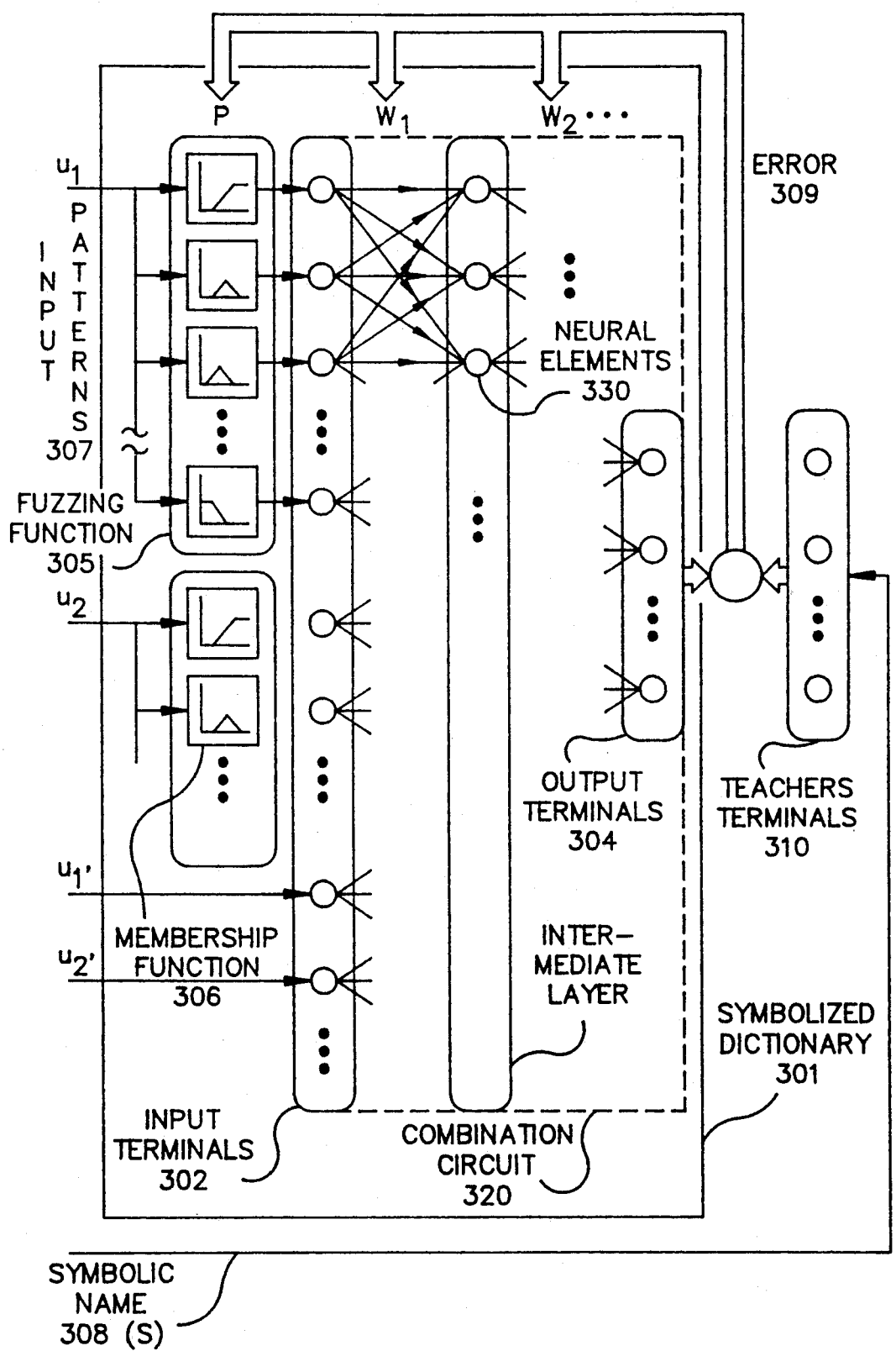
FIG. 3 shows an example of a structure of the symbolized dictionary and its generating function.

FIG. 3 shows one structural embodiment of the symbolized dictionary generating system. In FIG. 3, the symbolized dictionary is designated at 301 and is given pairs of input patterns ($u_1, u_2, \ldots, u_1', u_2', \ldots$) 307 and corresponding symbolic names 308. Parameters p, $w_1$, $w_2$, ... in the dictionary are adjusted so that the output terminals corresponding to the symbolic names given to the input patterns may ignite. Of the input patterns, the patterns $u_1, u_2, \ldots$ take continuous values, whereas the patterns $u_1', u_2', \ldots$ take symbolic or discrete values. For the patterns taking the continuous values, the conformity degree of the discrete state is determined through a membership function 306. A fuzzing function 305 is to determine all the discrete states. The parameter p is to specify the position of the membership function.

The input patterns taking the continuous values are inputted to a combination circuit 320 through the fuzzing function whereas the input patterns taking the discrete values are inputted directly to the combination circuit 320. This combination circuit 320 outputs the data inputted from input terminals 302 to output terminals 304 through an intermediate layer 303 formed of layers of neural elements 330. The individual layers from the input terminals 302 to the output terminals 304 are bonded by using the parameters $w_1$, $w_2$ as weights.

The parameters p, $w_1$, $w_2$, ... of the symbolized dictionary are so adjusted that the neural elements of the output terminals corresponding to the symbolic names corresponding to the input patterns may ignite. These adjustments can be executed while feeding back the differences 309 between the desired ignition states given to teacher's terminals 310 and the dictionary outputs 304 on the basis of either the algorithm of the back propagation or the aforementioned algorithm.

By the structure thus far described, the input patterns can be discriminated and transformed to proper symbolic names. The multi-layered network well known as neuro computing technology provides merely the portion of the combination circuit 320 in FIG. 3 but not any counter-measure for the inputs taking the continuous values. The present invention is characterized in that the fuzzing function 305 is disposed at the previous step of the combination circuit to provide a powerful pattern classifying function even for the continuous value inputs.

Figure 4:
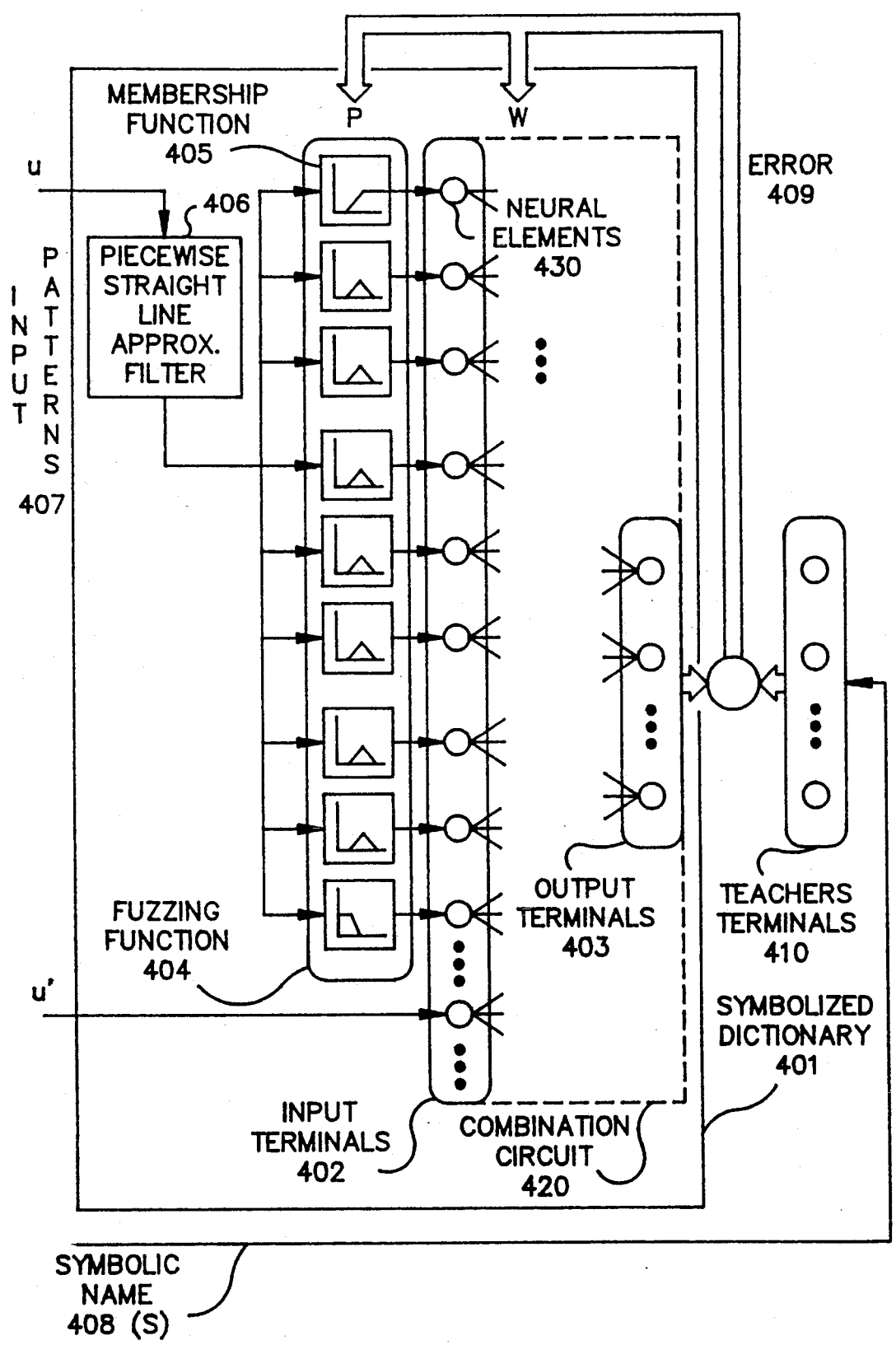
FIGS. 4, 5 and 6 show other examples of structures of the symbolized-dictionary and its generating function.

FIG. 4 shows examples of the structure of the symbolized dictionary and its generating system when some input patterns are to be grasped as time series phenomenon. The differences from the structure and method shown in FIG. 3 reside in that a piece-wise straight line approximating filter 406 is disposed prior to the fuzzing function. The function of the present filter 406 is to filter out a frequency component which should not be considered, from the time series varying input. Thus, it is possible to detect which inputs have tendencies to ascend, take an equilibrium state or descend and the timewise rate that the inputs take. The aforementioned filter, invented by Nishiya et al., provides approximations by piece-wise straight lines which can be especially proper so that the subsequent processing can be advantageously executed.

By the structure thus far described, it is possible to discriminate the symbolic names for the patterns including the time series fluctuating inputs and to generate the processing structure.

Figure 5:
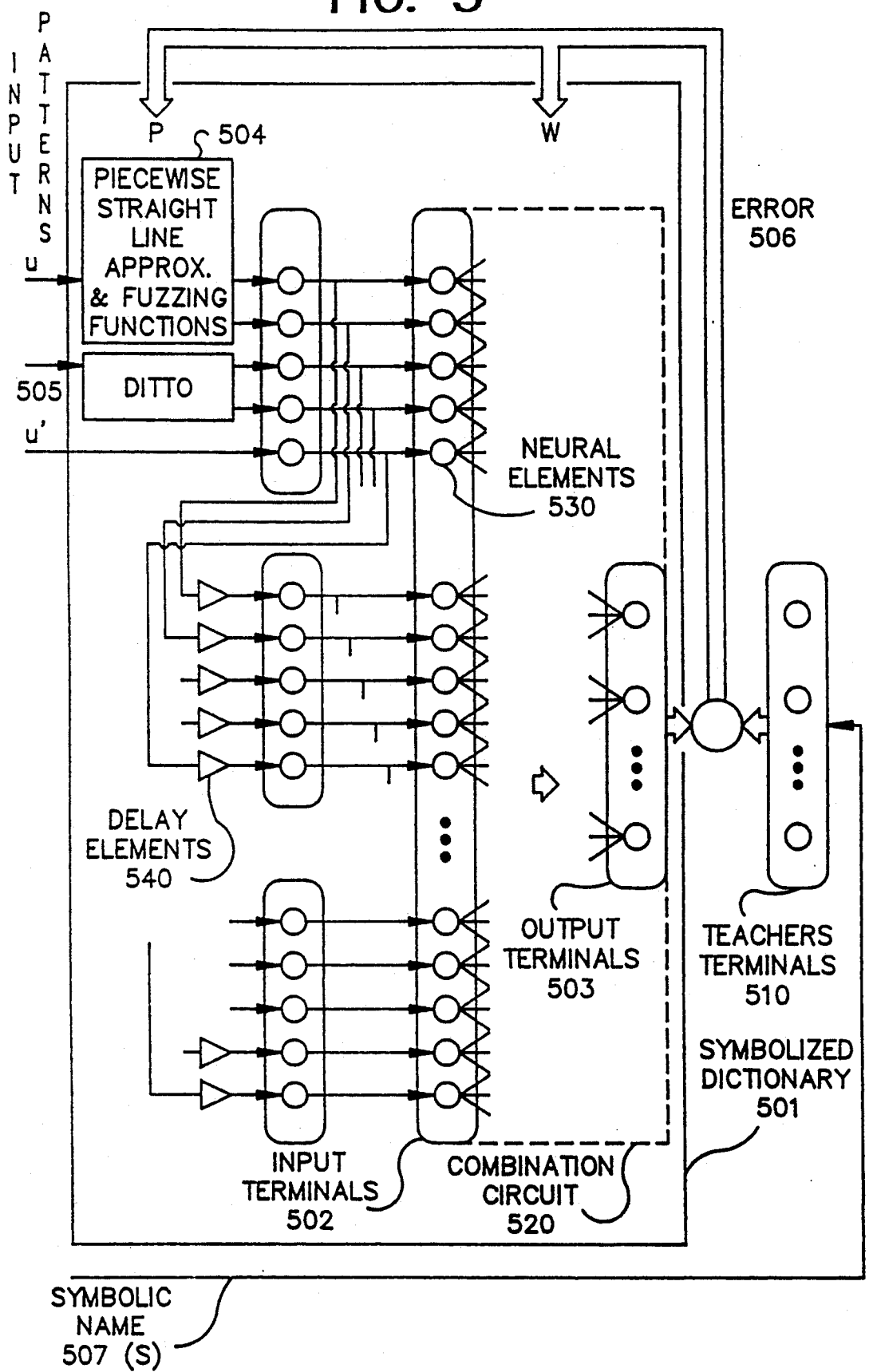

FIG. 5 shows examples of the structure of the symbolized dictionary and its generating system when what forms the input patterns is grasped as the time series phenomenon and when the patterns have to be discriminated back to the past inputs. The differences from the structure and system shown in FIG. 4 reside in that not only the recent inputs but also the past inputs are stored so that all of them are inputted to a combination circuit 520. In order to store the input patterns, delay elements 540 are provided so that pattern discriminations considering the past inputs can be performed by shifting the input data in synchronism with the inputting timings.

Figure 6:
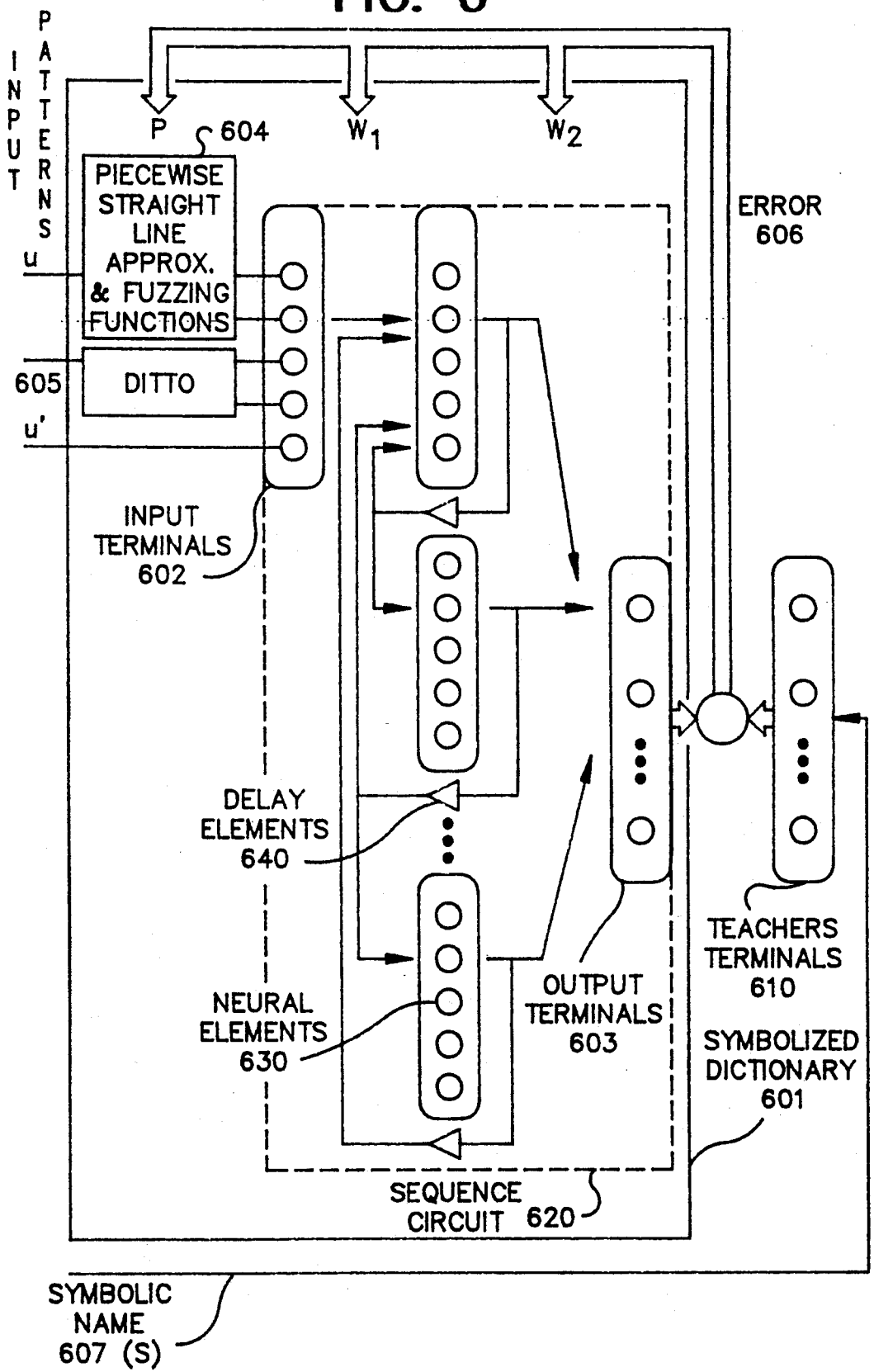

FIG. 6 shows another example of the structure of the symbolized dictionary and its generating system of FIG. 5 when what forms the input patterns is to be grasped as the time series phenomenon and when the patterns have to be discriminated back to the past inputs. This example aims at reducing the quantity of shift registers and the number of parameters to be estimated when the input patterns have to be retracted to a long past. For this aim, the symbolized dictionary is not constructed of the combination circuit but a sequence circuit. The method of constructing the sequence circuit is well known by the name of "Jordan network", but here will be described as another method although the Jordan network may also be used. The circuit of FIG. 6 can be best understood by describing the causal relationships, which occur from the bilinear model structure expressed by the Equation (2), in a graph form.

The structure of the symbolizing dictionary and the method of forming the dictionary have been described heretofore. Next, the model generating method will be described.

Figure 7A:
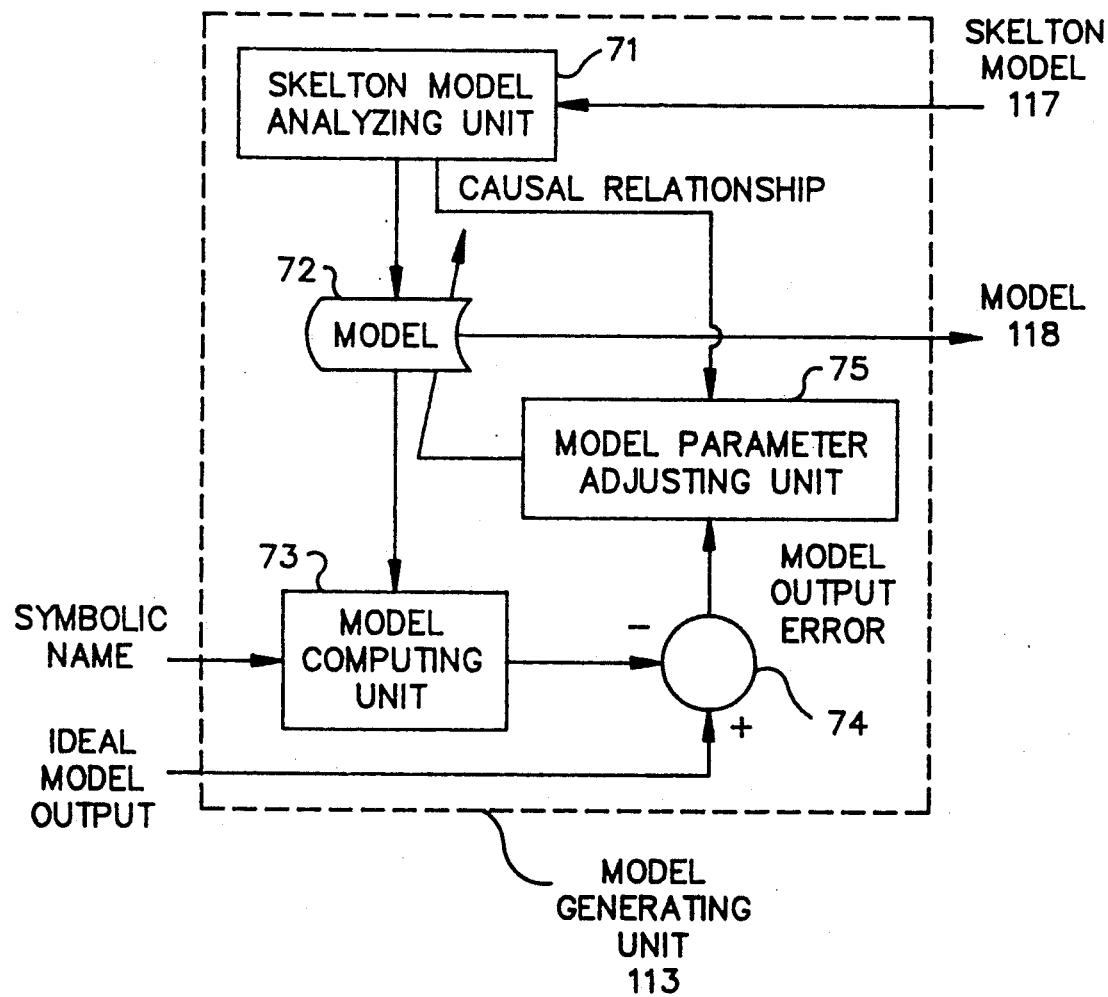
FIG. 7a shows a block diagram of a model generating unit.

FIG. 7a shows a block diagram of the model generating unit 113 which determines uncertain parameters in a skeleton model 117 given by the system user. A fundamental idea for generating a model is to minimize the differences between the ideal model output which is a part of the model I/O example 116, and the actual model output by adjusting parameters in the model. In order to improve adjusting efficiency, the causal relationship among the variables in the skeleton model 117 is analyzed by tee skeleton model analyzing unit 71. The skeleton model analyzing unit 71 also sets an initial guess of uncertain parameters, which might be given by the system user in some cases. Based on the model, the model computing unit 73 outputs a model output according to the model inputs and grades of symbolic names. The model parameter adjusting unit 75 determines parameter values to be adjusted in order to minimize the model output error. In this operation, the causal relationship given by the skeleton model analyzing unit 71 reduces the parameter adjusting effort because the causal relationship clearly specifies which parameters cause the model output error. By iterating the operation of model computing and parameter adjusting, the parameter values can be determined which minimize the model output error.

Figure 7B:
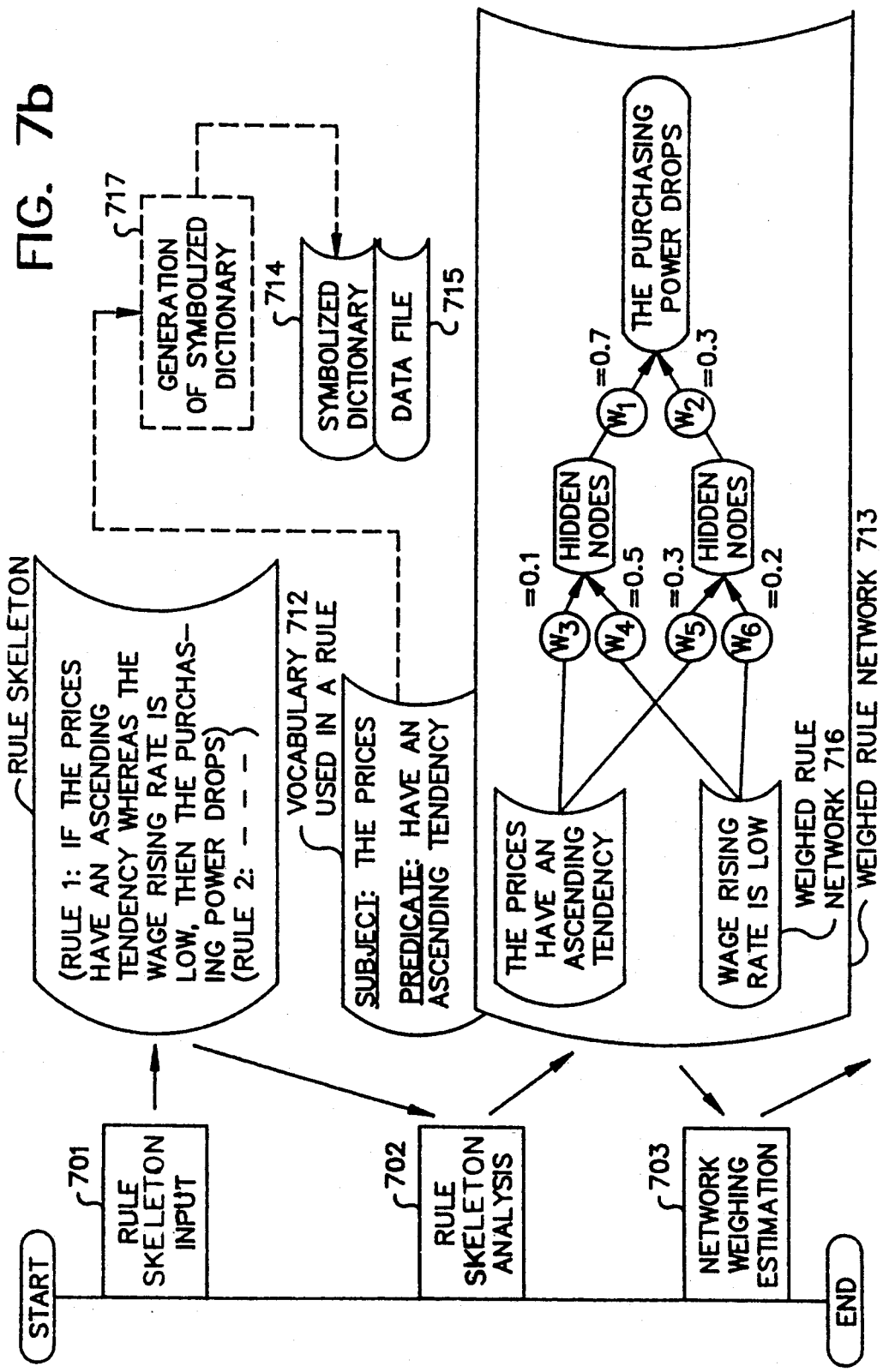
FIGS. 7b and 7c illustrate an example of the model generating procedures.
Figure 7C:
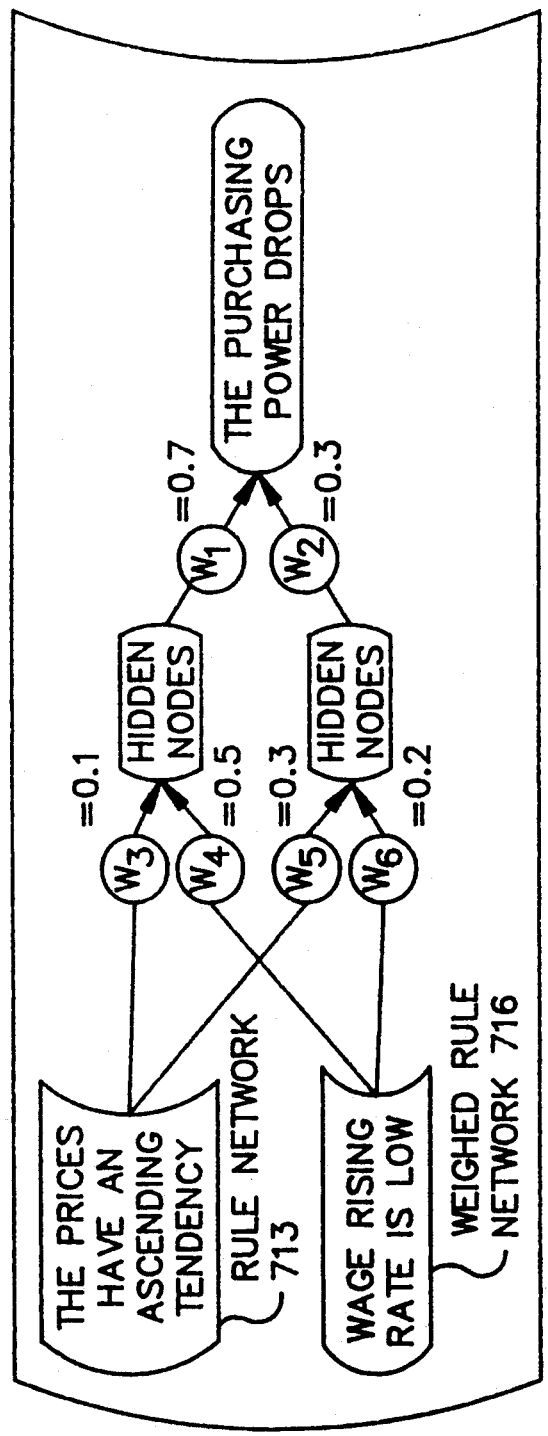

FIGS. 7b and 7c show the model generating method, i.e., how the conceptual model originally generated by the expert is to be adjusted from the result data. The example comprises an analysis of stock dealing prices and the available purchasing power of buyers. First of all, the conceptual model is given as a rule frame at 701 in accordance with the knowledge engineering method of the invention. Next, the rule frame is analyzed to extract a rule word 712 used in the rule and to express the rule as a network 713. At the rule frame in the network 713, the strength of the bondage between the premise and conclusion of the rule is not fixed so that the rule network 713 is expressed in a form containing the unknown parameter w. A symbolized dictionary 714 is prepared from the rule word obtained as a result of the rule frame analysis so that the input data can be transformed to the symbolic names. By using this symbolized dictionary 714, result data 715 and the rule network 713, a specific value of the weight w in the network can be determined for production of a network weighing estimation 703. This determination of the weight w can be achieved by the aforementioned mathematical optimizing method. The specific model computations can be performed by the weighed rule network 716 thus determined.

The result data comprises a mixture of data which has to be estimated as the most proper parameter of high uncertainty from the numerous data, and the data having a high certainty as the causal relationship. In this case, it is not proper to apply the model uniformly to all data, i.e., to estimate the parameters. In this case, when the mathematical optimizing method is to be applied, the expressions of the object function (i.e., the optimization reference) may be set more arbitrarily. Specifically, the expression of the likelihood of the Equation (3) is set in ordinary cases, as follows:

$$L(p) = \sum_i 1/\sigma^2(yi - h(p, ui))^2. \quad (12)$$

wherein: p: the parameter to be estimated; $\sigma^2$: a model applying square error; yi: the result output of the sample i; and h(p, ui): the model output when the result input of the sample i is given to the model. In case the reliability of the aforementioned data is clearly different, the error $\sigma^2$: in the Equation may be arbitrarily changed.

By the aforementioned procedures, the rule including an uncertainty also owned by the expert can be utilized in the form backed up by the result data so that more highly reliable advice and manipulation commands can be outputted.

FIG. 8 shows one realized mode of the invention in a distributed type computer system. The hardware structure is centralized by a data gathering management computer 803, and a process monitor control work station 813 operating in the real time environment, process management work stations 810, 812 operating in the engineering office environment and a process analysis work station 811 are individually connected with a process LAN 816 and an engineering office LAN 815. The data gathering management computer 803 gathers data from a controller 817 for monitoring and controlling the real time fluctuating process (such as the physical phenomenon of a plant or the economical phenomenon of stock prices) and stores them in a process result database. The individual work stations operate the models arithmetically on the basis of the data, which are saved and stored in that database, to provide various advice.

Here, the communication channels are so busy that they cannot actually function, if the necessary data is transferred at each time of advice from the database to the work stations. On the other hand, the data gathering management computer 803 is overloaded if it is used to execute all the arithmetic model operations. In order to solve this overload, the symbolic naming may be performed for the result data by the data gathering management computer 803, and the results may be transmitted to the individual work stations. This corresponds to the fact that the symbolization performs a kind of data compression. The load of the symbolization is low, as is apparent from its algorithm, and can be pipe-lined so that it does not become excessive even with the symbolizations for the arithmetic model operations of all work stations.

A process LAN 816 for gathering the process data may take a form of simultaneous communications from the process side. In this case, the symbolizations at the side of the process monitor control work station 813 is more effective for enhancing the autonomy of the system and for reducing the communications.

Since the symbolizations correspond to a kind of data compression, the storage cost can be drastically reduced by the symbolizations for all data when the data are to be saved and stored. Although the detail of original data is lost at the time of symbolizations, the original data may be stored in a medium having a low storage cost.

Figure 9:
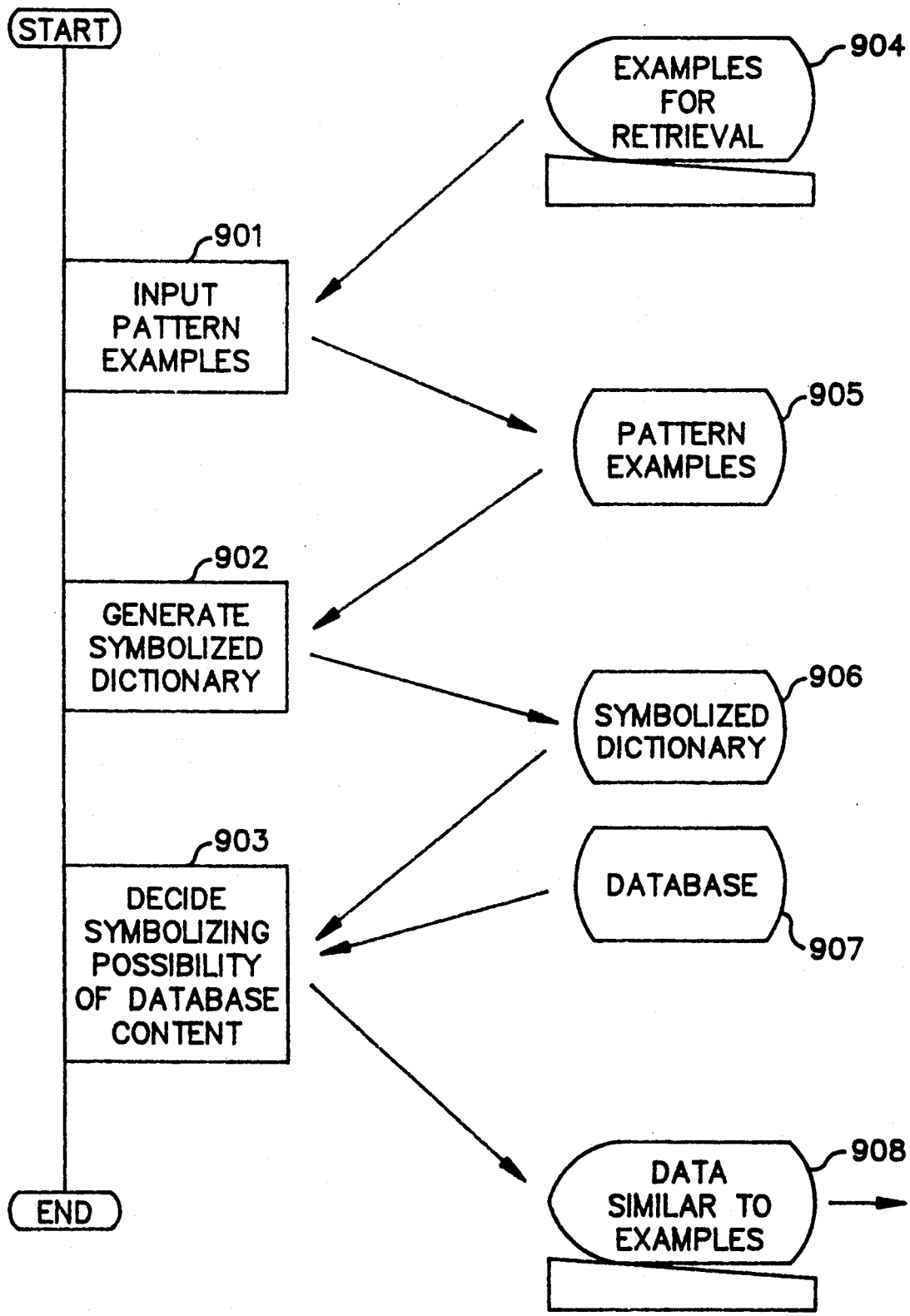
FIG. 9 shows an example of the retrieving procedures for the case of a presenting type database.

FIG. 9 shows another application example of the system for generating and utilizing the symbolized dictionary provided by the present invention. In this application example, the request for retrieval of the database is not given by designating the items or data ranges as in the prior art but in the form of the data combination (or pattern) example so that data similar to the pattern example can be retrieved. As shown in FIG. 9, the retrieving procedures are to give the data to be retrieved at first as a pattern example (at 901), and then the symbolized dictionary is generated from this example (at 902). For the dictionary generation, the symbolic name corresponding to the teacher's signal is required and may be given as either binary information whether or not it corresponds to the pattern example or the conformity degree information. Finally, the data is inputted from the database to the symbolized dictionary generated, and the input data, in which such neuro elements of the output terminals of the symbolized dictionary, as indicate the correspondence of the pattern, are in the igniting state, are presented as the retrieval result (at 903). As a result, how to request the database for the retrieval can be drastically simplified.

A practical example of the invention is shown in FIG. 8. In a computer integrated manufacturing system, the process operation and management plays a central role where different skilled people participate.

Managers in the head office and process site office should know what situations are happening in the manufacturing processes. Conventionally, it is very troublesome for the managers to access the process data base, because they must specify conditions to retrieve what they want to know in numerical form. Alternatively, the process engineers or the information systems engineer can prepare retrieval programs for the managers, which oftentimes can cause a significant program development burden and still scarcely meet the requirements of the managers.

The invention solves such problems as is detailed in FIG. 9. The managers can access the process data base through the workstations 810 and 811 where they only need to show to the system an example pattern to be retrieved.

The process engineer must work a lot of jobs for process operation and management. These jobs include:
(1) surveillance of process data to confirm that the process works as he intended,
(2) enhancing knowledge about dynamics of the process through building the process models,
(3) designing and improving process operating and monitoring schemes for the operators.

The process engineer can reduce his efforts for the above mentioned jobs and improve the job qualities by interacting the process workstation 811 and the data gathering and management computer 803 on which programs based on the invention run. The surveillance job for data acquisition can be effectively supported by the part of the invention described in FIG. 9. The knowledge enhance job can be fostered by the main part of the invention as shown in FIG. 1 and the designing and improving job can be effectively conducted by the part of the invention shown in FIG. 2.

The process operator may have to monitor more than a thousand trends of process values so as to confirm that the process works as specified by the process engineer. It is almost impossible for the operator to monitor such a large amount of data. Conventionally, this fact sometimes causes serious perturbations of the process. The symbolizing unit 121 and related functions as shown in the invention can screen the process abnormalities so as to reduce such an operator burden. Usually the operator will follow the operation guidance, that is an output of the program developed by the process engineer, but sometimes the operator may want to assure the guidance based on the past experiences. Conventionally, it is very difficult for the operator to identify data similar to the current trends from the process data base, but as described for manager assistance, the current invention can effectively support data retrieval data based upon what the operator wants to know.

The application of the present invention has been presented as based on computer integrated manufacturing, but the application of this invention is not limited to this particular manufacturing field. By replacing the process engineer and the process operator with a trade analyst and a trader, respectively, in the above description, it is easily foreseen that the present invention also effectively works for a stock trading system.

Effects of the Invention

As has been described hereinbefore, according to the present invention, the two problems important for realizing the system, which aid in the decision and judgment on the basis of the knowledge of the expert (or by utilizing the a priori knowledge to the maximum), namely, the difficulty in acquiring (or logically describing) the recognizing knowledge of a number of data combinations (or patterns) and the difficulty in adjusting the knowledge on the basis of the result data, are solved. As a result, the decision support system can be constructed remarkably easily, and the pertinence and reliability of the information obtained from the system can be drastically improved.

Having thus described the invention, it is claimed:

1. A learning type decision support system for outputting advice and process manipulate command values to system users by receiving input data including on-line data and file data, comprising: learning means including:
   a symbolized dictionary generating unit comprising a combination circuit with a weighing parameter including a network of multi-layered neural elements and comprising means for generating a symbolized dictionary for giving a symbolic name in accordance with a pattern comprised of a combination of values of said input data from given examples of a pair of said pattern and said symbolic name,
   a preprocessing unit having means for transforming a portion of said input data into said symbolic name by referring to the symbolized dictionary and,
   a model generating unit having means for determining an unknown parameter contained in a predetermined skeleton model to transform said portion of input data and said symbolic name into desired advice and manipulate command values, by use of any of a rule, a numerical equation or an arithmetic algorithm, by providing to said skeleton model as a pair, said input data and transformed results comprising predetermined advice and manipulate command values, as an example; and
   executing means for arithmetically processing said input data to output said advice and said manipulate command values by using the symbolized dictionary generated by said learning means and a model.

2. The learning type decision support system according to claim 1, wherein said executing means includes:
   an optimal adjusting unit for adjusting the values of the portion of said input data wherein the adjusted values of the transformed results by the generated model may come the closest to an outside specified requested value.

3. The learning type decision support system according to claim 1, wherein said executing means includes an optimal adjusting unit for adjusting the values of the portion of said input data wherein a functional value of a processed result may be maximized or minimized.

4. The learning type decision support system according to claim 3, wherein said symbolized dictionary generating unit includes:
   a portion for expressing an excessive conformity prevention function (AICO by a differentiatable function, which takes 0 in the close vicinity of 0 but 1 in another range, so as to determine a most optimal combination of non-zero parameters by taking said AIC as a reference for determining values of said weighing parameters; and,
   a portion retrieving and determining a best parameter combination under said expression system.

5. The learning type decision support system according to claim 1, wherein said symbolized dictionary includes:
   a portion for arranging all the input data into symbolic variables with a conformity degree by transforming these of the input data to be given the symbolic names, which take a continuous value range, into symbols with the conformity degree through a fuzzy membership function;
   a portion for generating the symbolized dictionary in the fuzzy membership function and the combination circuit by adjusting the weighing parameters and the parameters of the fuzzy membership function by giving an example pairing of a model input data and a model symbolic name wherein the output terminal elements of said combination circuit indicating the symbolic names corresponding to the input data may take excited state values.

6. The learning type decision support system according to claim 5, wherein said symbolized dictionary generating unit includes:
   a portion for approximating the input data having said continuous value range, which vary over time, by piece-wise straight lines on a two-dimensional plane having time and value axes; and,
   a portion for inputting the approximated results into the combination circuit in a manner with the conformity degree to correspond to a one of three transformation signals comprising up, equilibrium and down signal transformations with the conformity degree.

7. The learning type decision support system according to claim 6, wherein said symbolized dictionary generating unit includes:
   shift registers of a constant length for latching ones of the values of said input data, which vary over time, and said signal variable values, with the conformity degree when inputted to said combination circuit; and,
   a portion for communicating said registers as inputs of said combination circuit.

8. The learning type decision support system according to claim 6, wherein said symbolized dictionary generating unit includes a portion for making such connections as to input the input data and feedback quantities of an intermediate layer to said intermediate layer in the layered structure by using a sequence circuit in place of said combination circuit.

9. A learning type decision support system according to claim 1, wherein said model generating unit includes:
   a portion for setting virtual values for unknown parameters in a frame model; and,
   a portion for sequentially improving said unknown parameters to minimize the difference between the model computed results obtained under said parameter set values and the advice and the manipulation command values corresponding to the transformed results to be obtained in pair with the input data by providing said input data and corresponding symbolic name generated by the symbolized dictionary generating unit as the inputs of said model.

10. The learning type decision support system according to claim 9, wherein said model generating unit includes:
    a portion for expressing an excessive conformity prevention function (AIC) by a differentiatable function, which takes 0 in the close vicinity of 0 but 1 in another range, so as to determine the most optimal combination of the non-zero parameters by taking said AIC as a reference for determining values of said unknown parameters; and,
    a portion for retrieving and determining a best parameter combination under said expressing system.

11. The learning type decision support system according to claim 9 including means for performing an intense weighing for setting said AIC.

12. A learning type decision support system according to claim 1, wherein said learning means and said executing means execute the arithmetic processing by a distributed type computer structure having a database management computer for managing a database and a data using side computer for using said database, and wherein said database management computer is equipped with the preprocessing unit for transforming original data into symbolic names to transmit said symbolic names to said data using side computer.

13. The learning type decision support system according to claim 12, wherein, when the data of said database is to be retrieved by the management of said database management computer, a retrieval request is presented as an example of patterns to operate said symbolized dictionary generating unit in real time so that retrieval may be performed on a basis of the symbolized dictionary generated.

14. The learning type decision support system according to claim 12, wherein, when the data of said database are to be stored by the management of said database management computer, said symbolic names are subjected to a data compression by using said symbolized dictionary so that the data of said compressed symbolic names may be stored.

15. A learning type decision support system wherein a pattern of input data can be transformed into an advice or manipulate command value result comprising:
    a symbolized dictionary unit for defining a symbolic name for a predetermined pattern of input data, including a combination circuit including a network of multi-layered neural elements to transform the predetermined pattern to the symbolic name, and further including means for selectively weighting the predetermined pattern by fuzzy membership functions prior to input to the combination circuit; and,
    means for adjusting weighting function parameters of the neural elements and the membership functions of the means for selectively weighting in accordance with model advice and manipulate command values.

16. The decision support system of claim 15 further including a piece-wise straight line approximating filter disposed for receiving the input data and communicating the input data to the means for selectively weighting for filtering undesired time series varying input data from the combination circuit.

17. The decision support system of claim 16 further including delay elements for concurrently combining current and past input data patterns to the combination circuit.

* * * * *